US007337135B1

(12) United States Patent
Findlay, III et al.

(10) Patent No.: US 7,337,135 B1
(45) Date of Patent: Feb. 26, 2008

(54) ASSET PRICE FORECASTING (75) Inventors: M. Chapman Findlay, III, Los Angeles, CA (US); G. Michael Phillips, Pasadena, CA (US); William P. Jennings, Simi Valley, CA (US); Mark E. Rice, Pasadena, CA (US); Stephen A. Klein, Pasadena, CA (US)

(73) Assignee: c4cast.com, Inc., Pasadena, CA (US)

( * ) Notice: Subject to any disclaimer, the term of this patent is extended or adjusted under 35 U.S.C. 154(b) by 1527 days.

(21) Appl. No.: 09/692,748

(22) Filed: Oct. 19, 2000

Related U.S. Application Data (63) Continuation-in-part of application No. 09/615,025, filed on Jul. 13, 2000, now Pat. No. 6,907,403.

(51) Int. Cl.
*G06Q 40/00* (2006.01)

(52) U.S. Cl. ............................. 705/36; 705/35; 705/37

(58) Field of Classification Search .................. 705/35, 705/36, 37, 38, 7, 8, 9, 10
See application file for complete search history.

(56) References Cited

U.S. PATENT DOCUMENTS

| 6,061,662 | A  | * | 5/2000  | Makivic ................... 705/36 R |
| 6,321,205 | B1 | * | 11/2001 | Eder ............................. 705/7 |
| 6,418,417 | B1 | * | 7/2002  | Corby et al. .................. 705/35 |
| 6,681,211 | B1 | * | 1/2004  | Gatto .......................... 705/36 |
| 6,792,399 | B1 | * | 9/2004  | Phillips et al. ............ 705/36 R |
| 7,072,863 | B1 | * | 7/2006  | Phillips et al. ............ 705/36 R |
| 7,167,838 | B1 | * | 1/2007  | Gatto ....................... 705/36 R |

OTHER PUBLICATIONS

M. Chapman Findlay, III, "Financial Economics, Securities Litigation, and You", remarks presented to UCLA Securities Litigation Seminar in Mar. 1993, revised Nov. 1993, published by Findlay, Phillips and Associates.

M. Chapman Findlay, III, "Securities Fraud: Share Allocation Models", remarks presented to UCLA Securities Litigation Seminar in Mar. 1994, published by Findlay, Phillips and Associates.

(Continued)

*Primary Examiner*—Nga Nguyen
(74) *Attorney, Agent, or Firm*—Joseph G. Swan, P.C.

(57) ABSTRACT

Provided is a technique forecasting the direction in which the price of an asset will move by identifying a group of exogenous variables that are likely to influence observed prices of an asset. Then, historical data for values of the exogenous variables and historical data for the observed prices of the asset over a time period are processed to obtain a formula for calculating price estimates for the asset as a function of the exogenous variables. The formula is calculated using an input set of observed values for the exogenous variables at given point in time, so as to obtain a price estimate for the asset at the given point in time. Then, a similarity measure is determined by comparing the price estimate for the asset at the given point in time to the observed price for the asset at the given point in time. Finally, a direction in which the observed price of the asset will move is forecast based on the similarity measure.

35 Claims, 5 Drawing Sheets

OTHER PUBLICATIONS

M. Chapman Findlay, III, "Securities Fraud: True Value Lines", remarks presented to UCLA Securities Litigation Seminar in Mar. 1994, published by Findlay, Phillips and Associates.

M. Chapman Findlay, III, "Securities Fraud and Market Efficiency: Basic Concepts", published by Findlay, Phillips and Associates, 1995.

M. Chapman Findlay, III, "Securities Fraud and Market Efficiency: More Advanced Concepts", published by Findlay, Phillips and Associates, 1999.

M. Chapman Findlay, III, and G. Michael Phillips, "Securities Fraud: More on True Value Lines", published by Findlay, Phillips and Associates, 1999.

* cited by examiner

ASSET PRICE FORECASTING

This is a continuation-in-part of commonly-assigned U.S. patent application Ser. No. 09/615,025 (the '025 application) which was filed on Jul. 13, 2000 now U.S. Pat. No. 6,907,403. The '025 application (including all other applications incorporated by referenced therein) is incorporated by reference herein as though set forth herein in full.

BACKGROUND OF THE INVENTION

1. Field of the Invention

The present invention relates to techniques for forecasting how an asset price, such as the price of a share of stock, will move.

2. Description of the Related Art

Conventionally, many different approaches have been taken to predict how stock and other asset prices will move in the future. These varying approaches often have tended to reflect the forecasters' different philosophies, different investment time frames, different levels of knowledge and skill, and different access to relevant information.

With respect to investment philosophy, for example, the efficient markets hypothesis has received a great deal of attention in the recent past. Probably the most widely accepted version of this hypothesis holds that the market always accurately prices each asset based on all publicly available information. By accepting this assumption, it can be shown mathematically that many of the difficult problems of asset price forecasting disappear, and that the most effective asset management techniques involve little more than managing portfolios so as to diversify away as much risk as possible and then controlling the remaining risk so as to balance an acceptable level of risk against a desired rate of return. Two of the most popular models based on the efficient markets hypothesis have been the Capital Asset Pricing Model (CAPM) and the Arbitrage Pricing Model (APM).

While at one time nearly universally accepted, at least in the academic community, the efficient markets hypothesis has come under increasing criticism. Thus, the need to individually evaluate the pricing of stocks and other assets is becoming increasingly apparent. Moreover, even to the extent that the efficient market hypothesis holds, better risk measures are desirable in implementing the techniques suggested thereby. It is noted that, in addition to generating wealth for the individual, accurate asset pricing analysis has highly important implications with respect to efficient allocation of society's resources.

SUMMARY OF THE INVENTION

The present invention addresses this need by providing a technique for forecasting the direction in which the price of an asset will move by comparing an actual price for the asset to a predicted price for the asset.

More specifically, the invention is directed to forecasting the direction in which the price of an asset will move by identifying a group of exogenous variables that are likely to influence observed prices of an asset. Then, historical data for values of the exogenous variables and historical data for the observed prices of the asset over a time period are processed to obtain a formula for calculating price estimates for the asset as a function of the exogenous variables. The formula is calculated using an input set of observed values for the exogenous variables at given point in time, so as to obtain a price estimate for the asset at the given point in time. Then, a similarity measure is determined by comparing the price estimate for the asset at the given point in time to the observed price for the asset at the given point in time. Finally, a direction in which the observed price of the asset will move is forecast based on the similarity measure.

By predicting an estimated value for an asset and then comparing the observed price for the asset to that estimate, in the foregoing manner, it is often possible to forecast a change in the current price for the asset more accurately than conventional techniques would permit.

In more particular aspects of the invention, the asset is a share of stock and the exogenous variables used to obtain the price estimate formula include stock prices for other corporations in the same sector and may also include macroeconomic variables. As a result, the estimated price reflects industry-specific and macroeconomic effects, and the similarity measure reflects firm-specific information. By analyzing such firm-specific information, it is often possible to determine whether market momentum is moving toward or away from the stock and/or whether the market is over-pricing or under-pricing the stock.

The foregoing summary is intended merely to provide a brief description of the general nature of the invention. A more complete understanding of the invention can be obtained by referring to the claims and the following detailed description of the preferred embodiments in connection with the accompanying figures.

DETAILED DESCRIPTION OF THE PREFERRED EMBODIMENTS

Generally speaking, the present invention facilitates asset price forecasting by separating out different components of historically observed asset price movements. For example, in one embodiment of the invention where the asset is a share of stock, price movement information related to macroeconomic effects and/or industry-specific effects are separated out from the other components of the price movement. By appropriately performing such separation, these other components will consist mainly of firm-specific information. By having such firm-specific price movement information, an asset manager often will be able to determine whether the market is overpricing or underpricing a given asset. Alternatively, such an asset manager might determine that the market is responding appropriately to certain new information regarding the asset. In addition, when similar techniques are applied to a share of a mutual fund, the resulting asset-specific information may be used to signal apparent changes in the fund's investment strategy and/or performance.

Figure 1:
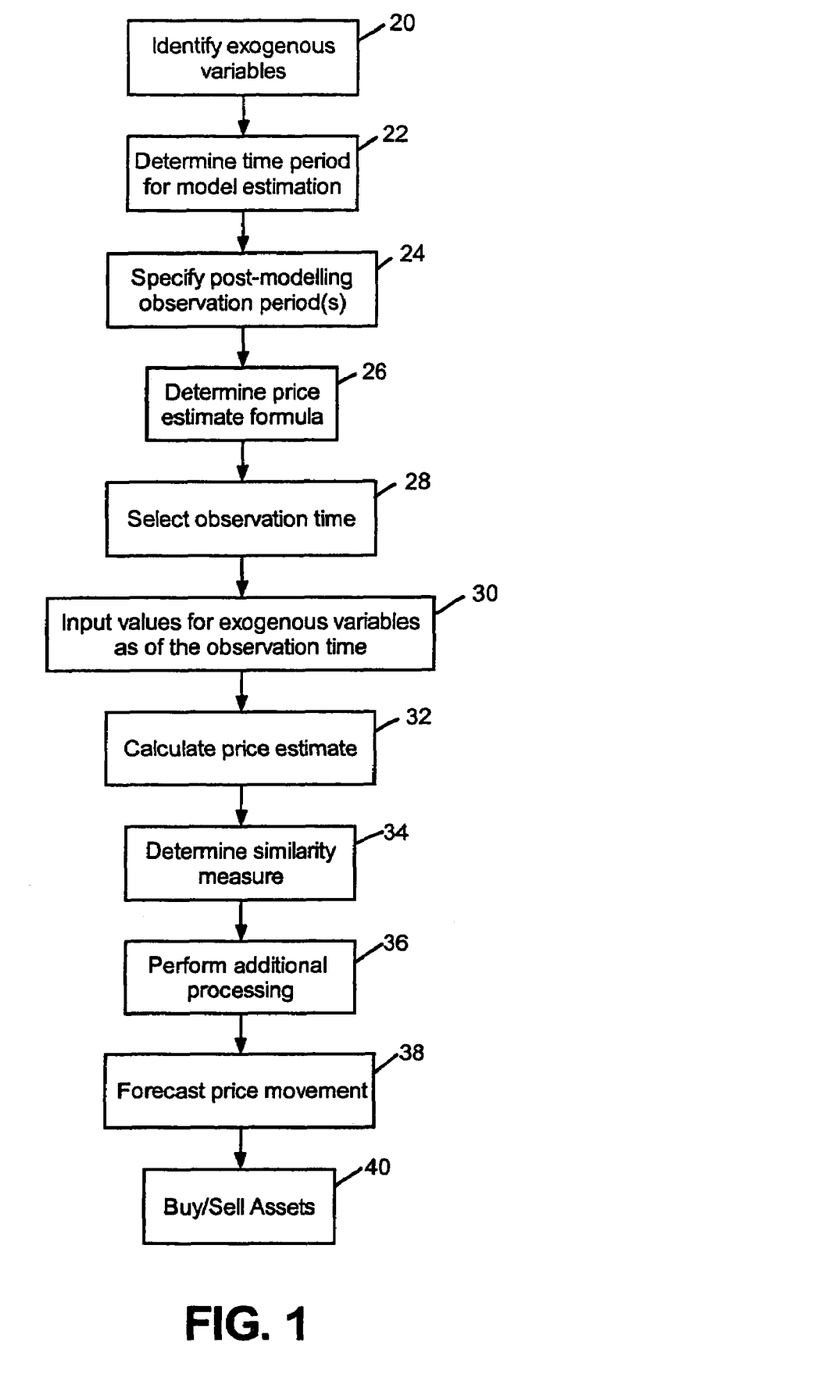
FIG. 1 is a flow diagram for explaining asset price forecasting according to a representative embodiment of the present invention.

FIG. 1 is a flow diagram illustrating process steps for performing asset price forecasting according to a first representative embodiment of the present invention. Briefly, according to FIG. 1: a group of exogenous variables that are related to or otherwise tend to influence the observed prices of an asset are identified; a time period for performing model estimation is determined; a post-modeling observation period is specified; a price estimate formula is determined based on historical values for the identified exogenous variables and historical data for the observed prices of the asset over the identified time period; an observation time is selected; values for the exogenous variables as of the observation time are input; a price estimate is calculated for the asset as of the observation time using the determined price estimate formula; a similarity measure is determined by comparing the price estimate for the asset as of the observation time to the observed priced for the asset as of the observation time; various additional processing may be performed; the direction in which the asset's price is likely to move is forecasted based on the similarity measure and/or on the results of any such additional processing; and, finally, asset purchases and/or sales are made based on the forecasted price movement.

In more detail, in step 20 a group of exogenous variables is identified. Preferably, such exogenous variables are related to or otherwise are likely to influence the price of the asset. For example, it is possible to select a group of exogenous variables made up of macroeconomic variables that are likely to affect the price of the asset. More particularly, such macroeconomic variables may include any or all of the macroeconomic variables identified in the '025 application. By selecting the exogenous variables in this manner, the resulting price estimate for the asset (discussed below) will be based on macroeconomic conditions, as well as asset-specific sensitivities to these changes.

Alternatively, it is possible to select a group of exogenous variables that include prices of similar or related assets. For example, in the event that the subject asset is a stock, this preferably will mean that the group includes prices of other stocks that are in the same industry or the same sector as the subject stock. In this regard, such "sectors" may be specified by using conventionally defined industry sectors. Alternatively, the "sectors" may be specified by using a statistical clusterization method, such as the clusterization method described in the '025 application. By selecting the exogenous variables to include prices of similar or related assets, the price estimate for the asset (described below) will be estimated based on industry-specific (or, more generally, group-specific) factors.

It is also possible to select the exogenous variables to include both macroeconomic variables and variables pertaining to prices of similar or related assets. This technique will tend to predict the price of the asset based on both industry-specific (or group-specific) factors, the selected macroeconomic factors, and firm-specific sensitivities to these factors.

The above discussion focuses on the types of exogenous variables that may be selected. Various techniques may be used to identify an appropriate group of specific (preferably, more relevant) exogenous variables from a larger set of potential exogenous variables of the desired type(s). Such techniques include: stepwise regression in which exogenous variables are tentatively added into the group and then retained only if the predictive power of the resulting model is sufficiently increased; performing an exhaustive search over the larger group of exogenous variables (i.e., testing all possible sub-groups); utilizing a genetic-algorithm-based technique to identify the smaller group of relevant variables, thereby avoiding the need to perform an exhaustive search; utilizing any other random search technique; and/or utilizing a neural network technique—for example, one in which all potential exogenous variables are input and only those exogenous variables having the greatest magnitude weights at the end of the training period are retained.

Most of the foregoing techniques will involve: performing multiple derivations of different price estimate models (or formulas) over a sample time period (as discussed below), one for each different sub-group of exogenous variables; evaluating the quality of each such resulting model; and then using the results of such evaluations to select the appropriate sub-group. For this purpose, the sample time period may be fixed or may be selected in conjunction with step 22 (described below).

Also, the particular exogenous variables selected typically will vary from asset to asset. However, it is also possible to utilize the same or a similar set of exogenous variables for different assets, such as for different assets in the same "sector", however defined.

In step 22, the time period is determined for model estimation, i.e., the time period over which historical data will be used in determining the price estimate formula in step 26, discussed below. In the preferred embodiment of the invention, once the duration of the time period has been determined, that duration can be re-used, e.g., on a rolling basis, for determining different price estimate formulas for the same asset. In this case, the only significant problem in determining the appropriate time period is that of finding an appropriate duration for the time period, with the beginning of the time period being dictated by other considerations (as discussed in more detail below).

Also in such a case, the duration typically will only need to be determined once and can then be re-used. However, due to changing economic conditions, it generally will be preferable to periodically verify that the earlier-selected duration is still optimal and then to make any necessary changes.

Preferably, the appropriate duration is defined as the duration that maximizes the goodness of fit for the regression or other modeling technique. Finding the most appropriate duration typically will involve a balancing between a duration that is long enough to ensure a sufficient statistical sample, on the one hand, versus a duration that is short enough so as to be likely to encompass a relatively similar set of economic conditions and/or to reduce the computational requirements of the model.

One way to accomplish such balancing is to perform stepwise regression in which observations are sequentially added, gradually lengthening the duration of the time period, while at each of plural discrete points, estimating a model and then evaluating the accuracy of each such model. Another technique is to perform a random, rather than sequential, search over different time period durations. In addition, the foregoing random search technique can be refined by employing a genetic algorithm to more effectively identify new time period durations to be evaluated.

In any event, the general technique for determining the most appropriate duration of the time period preferably will involve selecting different durations, deriving a price estimate formula (as discussed below) over that duration, evaluating the fit or accuracy of the resulting models, and then selecting the model that provides the best fit (i.e., that minimizes some function of the resulting errors). Such evaluations may be performed over a single time period for each duration or over plural different time periods for each duration, with the latter technique tending to reduce the effects of a single anomalous time period. Another technique is to perform tests of structural breaks in the underlying model to determine statistics regarding the lengths of time between structural breaks, and then to select the time period based on such statistics (e.g., using a central tendency of the lengths of time between structural breaks or such central tendency minus one standard error, the standard error being generally defined to be the square root of an estimate of the variance).

In addition, rather than simply determining a single duration that can be used in generating price estimate formulas on a rolling basis, it may instead be preferable to uniquely identify a time period for each individual model estimation. In this case, the time period can be selected for each individual situation so as to avoid structural breaks in the underlying model. For instance, in the event that a fundamental change in economic conditions has occurred, and it is desired to obtain a price estimate formula for a point or points in time after such change, it may be desirable to select the model estimation time period so as to encompass only points in time occurring after such change. Alternatively, it is possible to disregard such fundamental change for the purpose of selecting the appropriate time period, and instead to account for such change by pre-processing the underlying historical data used to generate the model, e.g., using identified relationships between the changed variable(s) and the exogenous variables actually used in the models in order to adjust the values of the exogenous variables used by the model.

It is noted that it is possible either to determine a different time period for each asset or to use the same time period for multiple assets. For example, to reduce computational requirements, it may be preferable to use the same time period for all assets that are classified in the same sector.

It is even possible to perform stepwise regression or any of the other techniques described above for each observation sample or for various groups of observation samples and to utilize only those observation samples that only provide the best fit, essentially discarding the remaining samples. While such a sample selection technique may have the effect of eliminating erroneous data points, it might also result in an unrealistically small estimate of the variability of the error in the resulting model.

In step 24, any post-modeling observation periods are specified. Such post-modeling observation periods are the lengths of time from the end of the time period used to determine the price estimate formula (determined in step 22) until the current time. The post-modeling observation periods are discussed in more detail in connection with the additional processing of step 36. However, data from such observation periods may be used, for example, to estimate stability of an industry or sector over time. Typical values are 30, 60 or 90 days, although any other period may be used.

It is noted that steps 20, 22 and 24 are discussed above and shown in FIG. 1 in a particular order. However, in practice, the order in which such steps are performed may be varied based upon the needs of the user. In fact, it may be desirable to perform some or all of such steps concurrently, so as to better identify the combination of time periods and exogenous variables that will result in the best price estimate formula.

Each of steps 20, 22 and 24, whether performed separately or in combination, generally involves determining price estimate formulas under different conditions and then attempting to find the set of conditions that provides the best price estimate formula. Such price estimate formulas can be determined using a neural network technique, a regression technique, a genetic algorithm technique, and/or any of the other techniques described in the '025 application for determining a price formula or similar formula.

In step 26, the price estimate formula is determined using the parameters identified in steps 20, 22 and 24. Often the price estimate formula will already have been generated and evaluated in the preceding steps and so, in such a case, only the best price estimate formula will need to be selected in this step.

However, if some of the parameters have changed, then it may be necessary to redetermine the price estimate formula. This will be the case, for example, where the duration of the model estimation time period has been identified but, for the current purposes, the actual desired time period is different from the one used for the model estimation (e.g., a different starting point). In this event, the price estimate formula can be determined using a neural network technique, a regression technique, a genetic algorithm technique, and/or any of the other techniques described in the '025 application for determining a price formula or similar formula.

It should be noted that the same announcement date problems may exist in this technique as in the technique described in the '025 application. As a result, any of the approaches to dealing with such announcement date problems described in the '025 application may be utilized in this step 26, e.g., using the most recently announced data and possibly including one or more additional exogenous variables that indicate how old such data are. Alternatively, any other approach may be taken.

In step 28, an observation time is selected based on the needs of the user. This generally will be the time at which it is desired to obtain asset-specific price change information. The observation time typically will be dictated by external factors.

In step 30, values for the exogenous variables as of the observation time are input. Once again, announcement date problems may exist in this step 30. Thus, any of the approaches for coping with such problems discussed in connection with step 26 above may be used here, as well.

In step 32, a price estimate is calculated for the subject asset as of the observation time selected in step 28 by calculating the price estimate formula obtained in step 26 with the exogenous variable data values input in step 30. Such calculation may be performed in a straightforward manner if an equation has been obtained. Otherwise, the calculation will depend upon the nature of the formula. For example, if a neural network has been used, the values for the exogenous variables can simply be input into the neural network.

It is noted that, up until this point, the processing performed is similar to that described in the '025 application. As a result, all of the techniques and considerations described therein generally can be applied here as well.

In step 34, a similarity measure is determined by comparing the price estimate calculated in step 32 to the actual price of the subject asset as of the observation time. Such a similarity measure may, for example, be (or be a function of) any of the following:

$$Diff_a = AP - EP_a \quad (Eq.\ 1)$$

$$Ratio_a = \frac{AP}{EP_a} \quad (Eq.\ 2)$$

$$Relative_a = \frac{Diff_a}{EP_a} \quad (Eq.\ 3)$$

$$T_a = \frac{Diff_a}{\sigma_a} \quad (Eq.\ 4)$$

$$Cumulative\_Average_a = \frac{1}{a}\sum_{j=0}^{a-1} AP_j - EP_{a,j} \quad (Eq.\ 5)$$

$$Weighted\_Cumulative\_Average_a = \frac{1}{a}\sum_{j=0}^{a-1} (AP_j - EP_{a,j}) * f(a, j) \quad (Eq.\ 6)$$

$$Relative\_Diff_a = \frac{Diff_a}{Cumulative\_Average_a} \quad (Eq.\ 7)$$

where AP is the observed asset price as of the observation time; $EP_a$ is the price estimate calculated in step 32 from a price estimate formula derived over a period ending a days ago (i.e., the post-modeling observation period determined in step 24 has a duration of a); $\sigma_a$ is a measure of the variability of the price estimate formula, such as the standard error of the price estimate formula (i.e., the square root of an estimate of the variance of errors of the price estimate formula) over the post-modeling observation period or over the model estimation period; $EP_{a,j}$ is the price estimate calculated for day j of a post-modeling observation period of duration a; and f(a,j) is a weighting function that preferably is greater for more recent observations during the post-modeling observation period, such as j or j/a, where j is the number of days since the end of the model estimation time period. The difference between actual asset price (Eq. 1) and the estimated price indicates how far "out of line" the asset's price appears to be. Any of Eqs. 1 through 7 may be used alone as the similarity measure or may be incorporated into a more complicated similarity measure.

It is noted that a similarity measure in the form of any of Eqs. 1 through 3 requires calculation of a price estimate for the asset at only a single point in time. For a similarity measure in the form of any of Eqs. 4 through 7, it generally will be necessary to repeat at least steps 28, 30 and 32 for a number of different observation times within the post-modeling observation period. However, this repetition might be avoided for a similarity measure in the form of Eq. 4 by using the variability of the price estimate equation over the model estimation period (i.e., a single value that is independent of the post-modeling observation period), rather than using the variability of the price estimate equation over the post-modeling observation period itself. Even with respect to similarity measures in the form of Eqs. 5 through 7, in certain cases the data for a particular observation time may have been previously calculated and therefore would only need to be retrieved from storage.

In step 36, any additional processing is performed. Some of the possibilities for performing this step are discussed below in connection with FIGS. 2 through 4.

In step 38, a price movement for the asset is forecast based on the similarity measure determined in step 34 and the results of any additional processing performed in step 36. Because the processing performed in this step 38 will depend upon the types of information provided by step 36, if any, as well as the specific similarity measure determined in step 34, a detailed discussion regarding the processing in this step 38 is deferred until after discussion of the processing illustrated in FIGS. 2 though 4.

In step 40, one or more assets are purchased or sold based at least in part on the forecast information provided by step 38. The specific actions taken in this step 40 often will be relatively straightforward based on the information provided by step 38. For example, if the forecast information provided by step 38 indicates that the price of the subject asset is likely to rise, then: the asset may be purchased, an option on the asset may be purchased, or any other derivative instrument whose value increases based on an increase in the underlying subject asset may be purchased.

In addition to basing the purchase/sale transaction(s) performed in step 40 on the results of step 38, such actions may also be based on information provided by other sources. For example, forecast information pertaining to other assets (e.g., information obtained by executing any of the techniques described herein for other assets) may also be input into this step 40. Such other forecast information may be particularly valuable where a portfolio manager has limited resources and is interested in purchasing only those assets with the greatest predicted price increases.

In order to then identify the most appropriate purchases/sales, an asset screening sub-step may be used in this step 40 to select assets based on the above-described forecast information and/or based on any other information. One example of such an asset screening technique is described in detail in the '025 application.

Other information that may be input into step 40 includes, for example, information pertaining to the transaction costs, tax consequences, or opportunity costs pertaining to various transactions. By processing all of such information, the most advantageous buy/sell decisions can be made.

Such buy/sell decisions may be made and executed automatically (e.g., using a programmed computer, such as described below), manually by a human operator, or by using any combination of such options. Preferably, at least a significant portion of such decision-making and execution is performed automatically, possibly after the computer (or other device) has suggested a course of action to, and then received appropriate authorization from, a human operator.

The effect of the technique described above in connection with FIG. 1 is to obtain a snapshot of the relevant information at a particular point in time or, in the case of utilizing data from an extended post-modeling period, to obtain a single figure (e.g., a composite similarity measure) that represents information over such extended period of time.

While such data are useful for certain purposes, it may also be beneficial to analyze and compare a sequence of data calculated in different ways.

Figure 2:
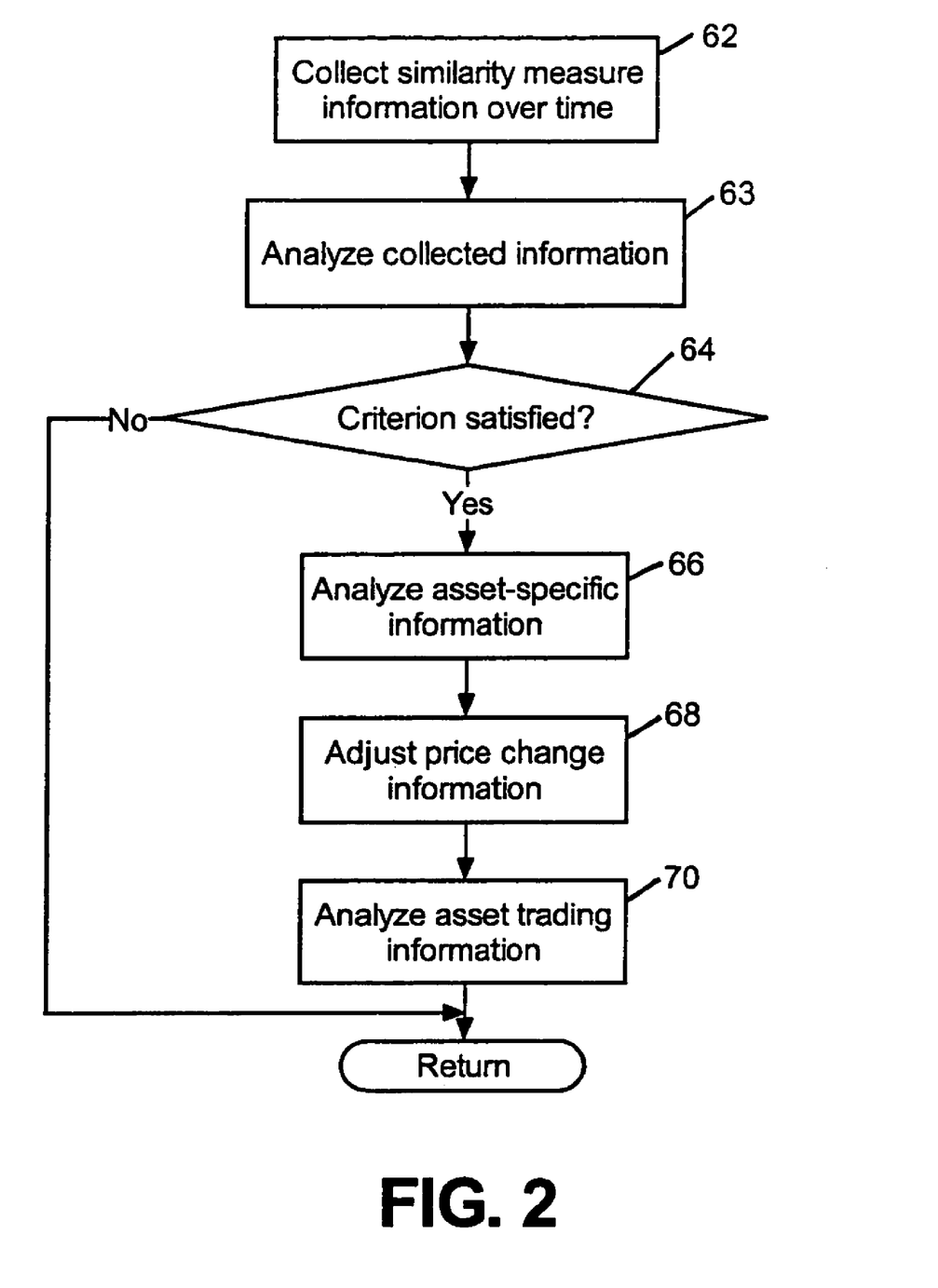
FIG. 2 is a flow diagram for explaining additional processing for use in connection with asset price forecasting according to a first representative embodiment of the present invention.

Thus, in another embodiment of the invention, illustrated in FIG. 2, asset-specific price changes are tracked over a period of time and such information is analyzed in order to make buy/sell decisions. It is noted that the technique illustrated in FIG. 2 may be performed as the additional processing of step 36 (shown in FIG. 1). Briefly, according to FIG. 2: similarity measure data (e.g., asset-specific price changes) are tracked over time; and, if a specified criterion is satisfied, asset-specific information is analyzed, the price change information is adjusted accordingly, and asset trading information is analyzed.

In more detail, in step 62 similarity measure information is collected over a period of time. In the preferred embodiment of the invention: the exogenous variables include prices of same-sector assets and, possibly, macroeconomic variables; and the similarity measure is (or is a function of) the difference between the actually observed price for the asset and the estimated price. As a result, the similarity measure reflects asset-specific information.

In any event, the similarity measure determined in step 34 preferably is collected at various observation time points (e.g., during the post-modeling observation period). Thus, in order to implement this step, at least step 28 may be repeated for multiple input observation times. For this purpose, the price estimate formula may remain the same or else may be changed by also repeating either or both of steps 20 and 22 in conjunction with step 24.

The similarity measure utilized may be, for example, any of the similarity measures discussed above in connection with step 34. However, because this embodiment of the invention tends to be concerned with more instantaneous price change information, it generally will be preferable to utilize a similarity measure, such as one of Eqs. 1 through 4, that does not average price change information over time.

On the other hand, a small amount of averaging may be desirable. Specifically, the effect of using an averaging technique is to provide a filtering effect. Too much of such filtering may obscure or delay notice of sudden price changes or even short-term trend information. However, a small amount of filtering may help to eliminate noise without introducing too much obfuscation. Accordingly, in alternative embodiments it may be preferable to use a similarity measure such as one of Eqs. 5 though 7 with a post-modeling observation period of, for example, two or three days for each observation point. As a result, in these embodiments two types or levels of post-modeling observation periods are used.

In step 63, the information collected in step 62 is analyzed. One prong of such analysis preferably includes a determination as to whether the collected data show any statistically significant occurrences or trends. In order to assess the statistical significance of the fluctuations, it often will be preferable to utilize a similarity measure that reflects asset-specific price change information and also takes into account historical variability in such asset-specific price change information. One such similarity measure is shown in Eq. 4 above. In such embodiments, the similarity measure has a built-in indicator of statistical significance.

In the event that any other similarity measure, such as any of the other similarity measures described above, is instead used, separate analysis regarding statistical significance may have to be performed. Such analysis typically may be performed by simply normalizing (e.g., dividing) the similarity measure by the standard error (or any other measure of variability) of the price estimate formula. If a similarity measure is being used that has information averaging properties (e.g., any of Eq. 5 through 7), then it generally will be desirable to adjust the single-observation standard error (or other measure of variability), as is well known in the art, in order to account for such averaging.

Various other types of analysis may also be performed in this step, with the exact analysis depending upon the criteria specified in step 64 (discussed below). Thus, a discussion of examples of such analysis is provided below in connection with the discussion of step 64.

In step 64, a determination is made as to whether one or more specified criteria have been satisfied. It is noted that a wide variety of criteria may be used, with the goal being to identify changes or, more preferably, statistically significant changes in the similarity measure and/or in the asset-specific price. For example, where the similarity measure reflects asset-specific price information, any or all of the following criteria may be used for this purpose: (i) if the asset-specific price change on any given day exceeds t times the standard error of the price estimate formula; (ii) if the asset-specific price change on N of the past P days exceeds t times the standard error of the price estimate formula; (iii) if a linear or non-linear regression on the asset-specific price changes over the past N days indicates a slope of greater than x; or (iv) if a non-linear regression over the asset-specific price changes during the past N days indicates a slope that is changing at a rate greater than y; where x, y, P and N may be determined theoretically, empirically or even arbitrarily, and where x and y preferably are functions of the standard error (or other measure of variability) of the price estimate formula.

A single criterion may be tested in step 64 or multiple different criterion may be tested. If any one of the tested criteria have been satisfied, then processing proceeds to step 66. Otherwise, processing returns to the calling routine.

In step 66, asset-specific information for the subject asset is analyzed in an attempt to identify any potential reasons for the observed condition. Although certain asset-specific information previously may have been used to adjust the data, this step preferably will involve a more in-depth investigation into information pertaining to the asset, which further investigation is deemed warranted as a result of triggering the conditions of step 64, and which preferably is specifically tailored to the triggering condition (or the combination of triggering criteria, in the event that multiple different criteria have been satisfied). The additional asset-specific information obtained in this step may include, for example, any information regarding management changes, lawsuits, new intellectual property, any information pertaining to a significant competitor, or any other information that might affect revenues or earnings of the underlying company. Preferably, such more detailed asset-specific information is only analyzed over the general time period during which the unusual asset-specific price changes were observed.

Preferably, step 66 is performed using a combination of automated algorithms and human research and analysis. Typically, information regarding the underlying company (in the case of the stock) will be gathered and analyzed by a human analyst, with one or more quantitative assessments of the impact of such information being input into the system of the present invention.

In step 68, the similarity measure information (e.g., asset-specific price change information) is adjusted to back out the impact of the asset-specific information. For example, if an announced management change, not previously accounted for, is expected to impact the price of the asset by 25 cents per share, then this amount can be subtracted from the asset-specific price changes during the subject time period. It is noted that this step may be omitted, for example, by simply providing information (preferably quantitative information) pertaining to the results of step 66, together with the similarity measure information (e.g., asset-specific price change information) collected in step 63. Upon completion of this step, steps 63 and/or 64 may be repeated to determine whether the adjusted price information is still statistically significant. Otherwise, processing proceeds to step 70.

In step 70, trading information regarding the asset is analyzed. Such information might include: trading volume, numbers of traders in the market for the asset, trading volume and/or numbers of traders for other related assets, breakdowns identifying who is trading the asset (e.g., institutional investors, individual investors, pension funds, aggressive-growth mutual funds, blue chip mutual funds, top management, etc.). The analysis preferably will determine trends in such information, such as by performing a regression or any of the other techniques described above for modeling data, and then determining the rate of change of such data over time (e.g., the first derivative with respect to time), the change in the rate of change over time (e.g., the second derivative with respect to time), or any other statistics.

Analysis of such trading information generally can be performed automatically by a system implementing the present invention. Such information may indicate potential market manipulation, such as in cases where one or two traders are doing nearly all of the purchasing and the asset is a thinly traded stock. Alternatively, such information may indicate increasing momentum for the asset, such as where the number of traders of the asset is increasing as the asset-specific price increases. Finally, such information may indicate trading on non-public information, or the dissemination of non-public information over time.

The analysis performed in this step 70 might include, for example, comparison of trend data for the current asset to historically observed trend data for other assets. For example, such historically observed trend data might indicate that when a pattern exists in which increased trading begins with a few large institutional investors and then spreads to smaller investors, momentum is likely to increase for a certain period of time. Thus, if the beginning of such a trend is observed with respect to the current asset, such an observation might strongly imply future price growth. Any of a variety of pattern matching techniques may be used to identify such trends.

Upon completion of step 70, processing returns to the calling routine, e.g., step 38 (shown in FIG. 1) in order to forecast price changes for the asset based on any or all of the data obtained in the preceding steps.

Another possibility for the additional processing of step 36 is to compare estimates generated using different post-modeling observation periods. This technique is illustrated in the flow diagram of FIG. 3. Briefly, according to FIG. 3: estimates are generated using different post-modeling observation periods; such estimates are compared; and if a specified criterion is satisfied, asset-specific information is analyzed, the price change information is adjusted accordingly, and asset trading information is analyzed.

Figure 3:
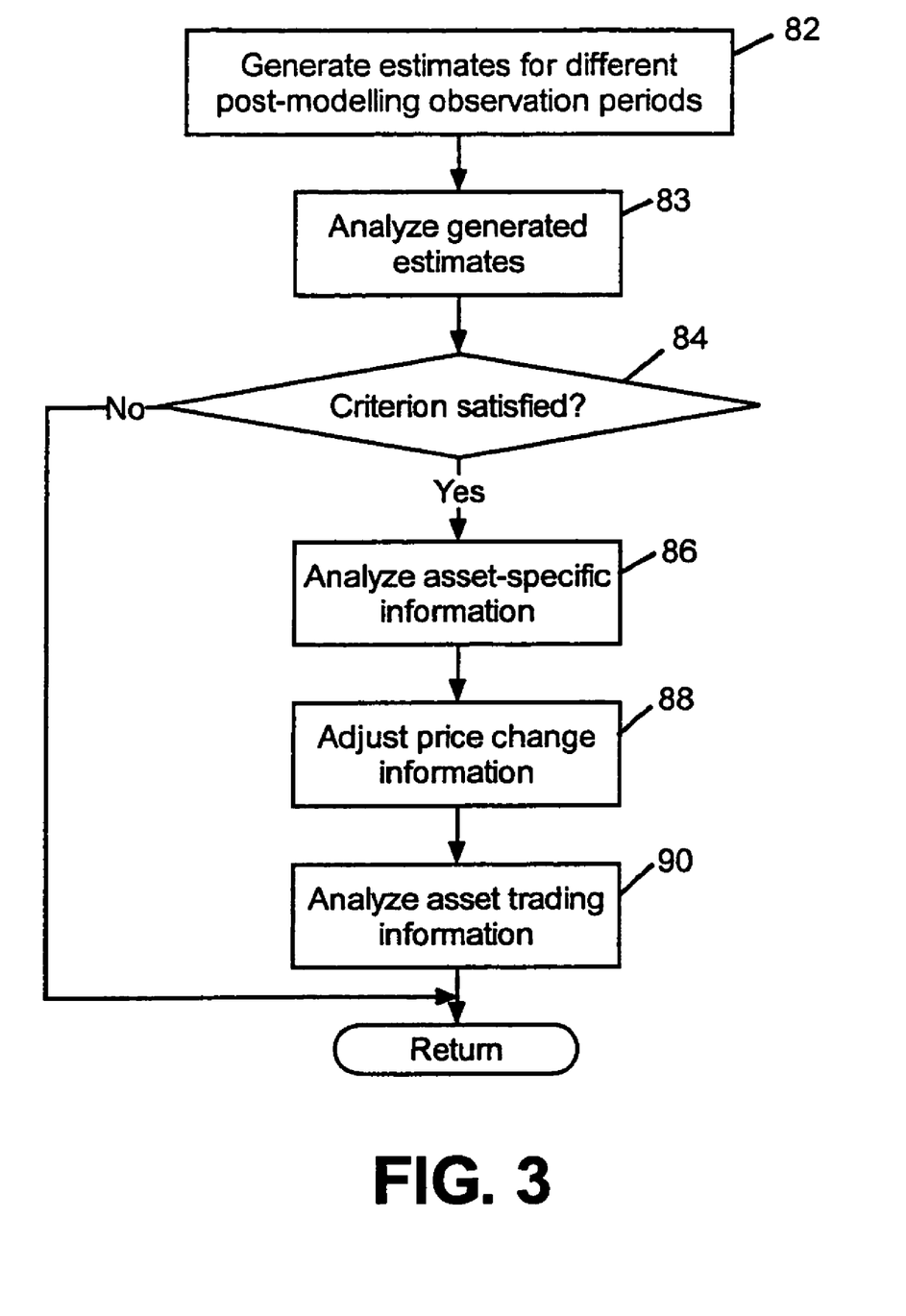
FIG. 3 is a flow diagram for explaining additional processing for use in connection with asset price forecasting according to a second representative embodiment of the present invention.

In more detail, in step 82 estimates are generated using different post-modeling observation periods. Preferably, this step is performed by repeating steps 22, 24, 26, 28, 30, 32 and 34, and specifying post-modeling observation periods having different durations each time that step 24 is repeated. For example, one may use two model estimation periods, each having the same duration, but one ending one month prior to the current date and one ending three months prior to the current date, meaning that post-modeling observation periods of one month and three months are to be used. Similarly, three post-modeling observation periods may be used, e.g., one month, three months and six months. It is also possible to vary the duration of the model estimation period corresponding to some or all of the post-modeling observation periods.

In step 83, the similarity measures corresponding to the different post-modeling observation periods are compared. Such comparison may be performed, for example, in the case of two post-modeling observation periods of duration a and b, respectively, by calculating any of a number of different comparison measures, depending upon the user's goals. Such a comparison measure might, for example, be (or be a function of) any of the following:

$$\text{EP\_Relative} = \frac{EP_a}{EP_b} \tag{Eq. 8}$$

$$\text{Diff\_Relative} = \frac{Diff_a}{Diff_b} \tag{Eq. 9}$$

$$\text{Relative\_Relative} = \frac{Relative_a}{Relative_b} \tag{Eq. 10}$$

$$\text{Relative\_T} = \frac{T_a}{T_b} \tag{Eq. 11}$$

$$\text{Relative\_Cummulative\_Average} = \frac{Cummulative\_Average_a}{Cummulative\_Average_b} \tag{Eq. 12}$$

$$\text{Relative\_Weighted\_Cummulative\_Average} = \frac{Weighted\_Cummulative\_Average_a}{Weighted\_Cummulative\_Average_b} \tag{Eq. 13}$$

$$EP\_Diff = EP_a - EP_b \tag{Eq. 14}$$

where the required similarity measures are given in Eqs. 1 through 7 above. Any of Eqs. 8 through 14 may be used alone as the comparison measure or may be incorporated into a more complicated comparison measure.

In the event that three or more different post-modeling observation periods are used, similar comparison measures may be calculated for each or any pair or, alternatively, similar composite comparison measures can be determined for all at once. For instance, a similar comparison composite measure for Eq. 13 might be to perform a linear regression over the Weighted_Cumulative_Average for each post-modeling observation periods and then identify the slope.

In step 84, a determination is made as to whether specified criteria have been satisfied. It is noted that a wide variety of criteria may be used, with the goal being to identify changes, or statistically significant changes, in the price estimates or similarity measures calculated using such different post-modeling observation periods. For example, the criterion may be whether the comparison measure, the absolute value of the comparison measure, or any function of either exceeds a specified (e.g., predetermined) threshold. In this case, the threshold typically will depend on the comparison measure used (e.g., a value of or close to 0 for difference-based comparison measures or a value of or close to 1 for ratio-based comparison measures), and may also be based on historically observed or otherwise expected measures of variability in the particular comparison measure for such different post-modeling observation periods.

In the case that more than two different post-modeling observation periods have been used, the criterion may be, for example, whether the differences or ratios between the comparison measures for different pairs such post-modeling observation periods, the absolute values thereof, or any functions of any of the foregoing, exceed one or more specified thresholds, or exhibit a significant trend, such as may be determined by calculating second or higher order derivatives or difference equations for such comparison values (or for the underlying similarity measures, for that matter).

The actual criteria used may be any of the foregoing, any criteria incorporating any of the concepts set forth in the foregoing, or any combination of these. As with step 64, different independent criteria may be tested in this step 84. In any event, if any of the specified criteria is satisfied, then processing proceeds to step 86. Otherwise, processing returns to the calling routine, typically step 38 (shown in FIG. 1).

In steps 86, 88 and 90, respectively, more detailed asset-specific information for the subject asset is analyzed, the asset-specific price change information is adjusted to back out the impact of the asset-specific information, and trading information regarding the asset is analyzed. These steps and the considerations pertaining thereto are identical to steps 66, 68 and 70, respectively, as described above. Accordingly, any of such steps may be omitted to the extent that the same step has already been performed. However, because the triggering criteria generally will be different in step 84, as compared with step 64, the information analyzed in step 86 and/or step 90 may also be different.

Upon completion of step 90, processing returns to the calling routine, typically step 36, shown in FIG. 1.

Figure 4:
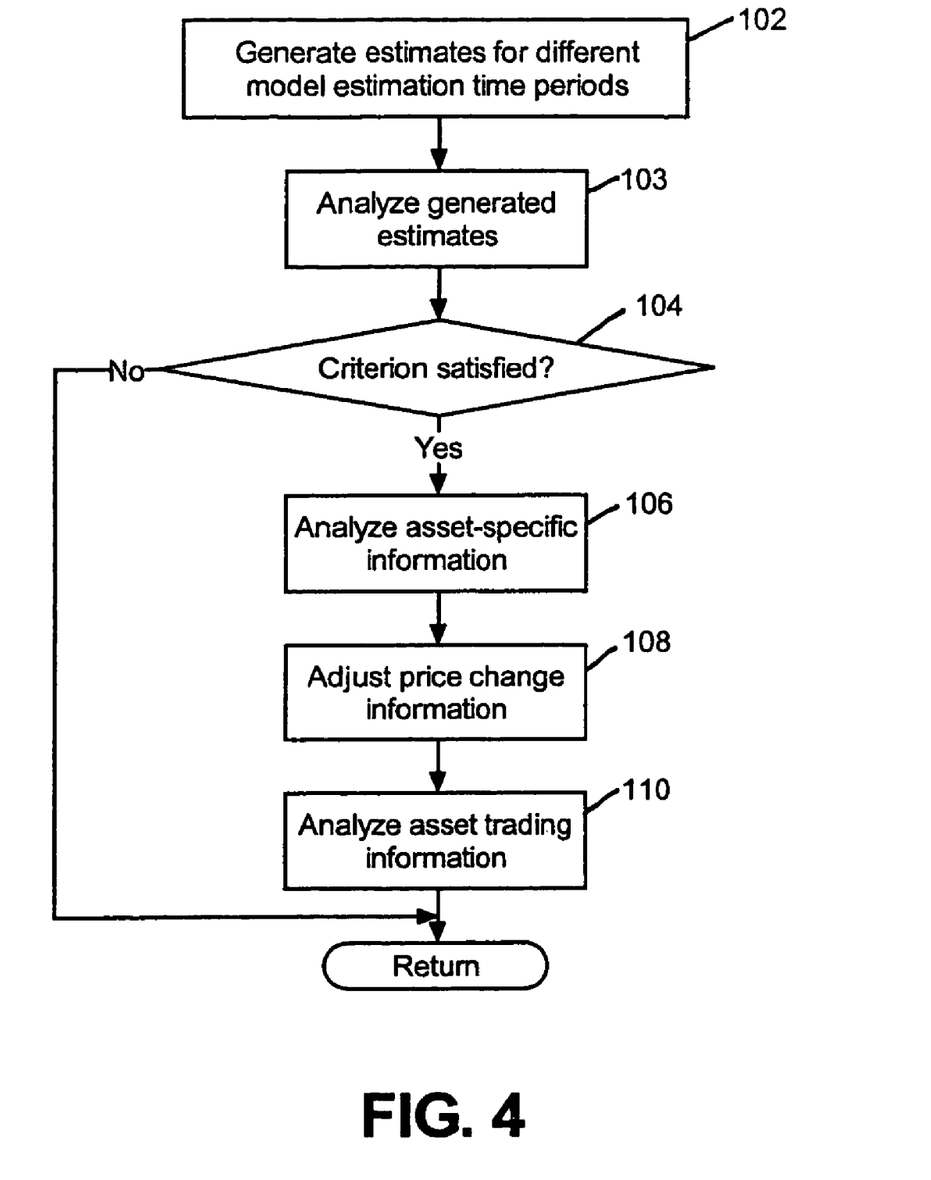
FIG. 4 is a flow diagram for explaining additional processing for use in connection with asset price forecasting according to a third representative embodiment of the present invention.

FIG. 4 illustrates an alternate technique in which price estimates for different model estimation time periods are compared. Briefly, according to FIG. 4: estimates are generated using different model estimation time periods; such estimates are compared; and if a specified criterion is satisfied, asset-specific information is analyzed, the price change information is adjusted accordingly, and asset trading information is analyzed.

In more detail, in step 101 estimates are generated using different model estimation time periods. Preferably, this step is performed by repeating steps 22, 24, 26, 28, 30, 32 and 34, and specifying model estimation time periods having different durations each time that step 22 is repeated. One option in this regard is to have all such model estimation time periods ending immediately prior to (e.g., the day before) the current observation time (i.e., the time point of interest). Another option is to have all such model estimation time periods ending at a specified fixed point prior to the current observation time (i.e., using a fixed duration post-modeling observation period). A third alternative is to have different model estimation time periods ending at different points prior to the current observation time (i.e., using different combinations of model estimation time period durations and post-modeling observation period durations).

In step 102, the similarity measures corresponding to the different model estimation time periods are compared. Such comparison may be performed, for example, by using any of the comparison measures discussed above in connection with step 82, but by using data from the different model estimation time periods rather than from different post-modeling observation periods. Thus, most of the options and considerations pertaining to step 82 will be applicable to this step as well.

In step 104, a determination is made as to whether specified criteria have been satisfied. Such determination may be based on, for example, any of the criteria discussed above in connection with step 84, but by using data from the different model estimation time periods rather than from different post-modeling observation periods. Thus, most of the options and considerations pertaining to step 84 will be applicable to this step as well. If any of the specified criteria is satisfied, then processing proceeds to step 106. Otherwise, processing returns to the calling routine.

In steps 106, 108 and 110, respectively, more detailed asset-specific information for the subject asset is analyzed, the asset-specific price change information is adjusted to back out the impact of the asset-specific information, and trading information regarding the asset is analyzed. These steps and the considerations pertaining thereto are identical to steps 66, 68 and 70, respectively, as described above. Accordingly, any of such steps may be omitted to the extent that the same step has already been performed, although in many cases they will not be identical.

Upon completion of step 110, processing returns to the calling routine, typically step 36, shown in FIG. 1.

In addition to individually performing the steps of FIG. 2, FIG. 3 or FIG. 4, any combination of such steps may be performed as the additional processing of step 36, shown in FIG. 1. Moreover, such steps can be integrally combined, such as by comparing both different model estimation times and post-modeling observation periods at the same time.

In view of the above-described additional processing that may be performed in step 36, a number of a different options exist for forecasting price movement in step 38. Some of these options are now described. Preferably, as indicated above, the similarity measure in the preferred embodiment of the invention is the difference between the observed price and the estimated price of the asset, and the exogenous variables are selected so that the similarity measure provides an estimate of the asset-specific pricing information. This preferred embodiment will be assumed in the following discussion, although the following discussion is generally applicable to other similarity measures as well.

Also, the interpretation of the data provided by the other process steps described herein generally will vary based on investor philosophy, time horizon, and so on. For example, momentum investors typically would interpret a large positive values of $T_a$ (after any adjustments described above) as a strong sign that the price of the asset will increase. Large values of Cumulative_Average$_a$, Weighted_Cumulative_Average$_a$ and Relative_Diff$_a$ would pride confirming indications and an EP_Relative greater than one, where b is greater than a, would provide still further confirming indications.

Longer run efficiency, value and fundamental investors might take opposing strategies. For example, large negative values for $T_a$ might indicate "oversold" stocks, which are potential purchase candidates, especially if Weighted_Cumulative_Average$_a$ and Relative_Diff$_a$ had large negative values. A Relative_Weighted_Cumulative_Average$_a$ of less than one would provide additional confirming indications to such investors.

For technical analysts, a change in sign for Diff$_a$ or movement through unity in Relative_Diff$_a$ could be viewed as an absolute or relative movement through a moving average, with all the attendant buy or sell indications. Likewise, an upward movement in EP_Relative accompanied by a downward movement in Diff$_a$ might be a sell indication to such technical traders.

Also, the ratio of the actual observed price to the estimate price (Ratio$_a$) can be interpreted like a traditional "ratio to moving average" where the estimate price with a given model estimation time period plays the part equivalent to the computed moving average. Thus, a 30-day model estimation time period would be comparable to a 30-day moving average, a 200-day model estimation time period would compare to a 200-day moving average, and so on.

In addition to simply calculating the similarity and comparison measures described above, a graph of such information (e.g., over the post-modeling observation period) often can allow one to visually see at what point the relation between the subject asset and the comparable assets changed. Such points might indicate that significant non-sector information has been made available.

As discussed above, the forecasting in this step often can be greatly aided by considering additional asset-specific information as well as asset trading information. By inputting the information obtained from the foregoing processing into a rule-based decision system, a neural-network-based decision system, or any similar system, the present invention often will provide more accurate forecasts than conventional techniques can provide.

Additional Considerations.

The foregoing processing also can provide additional valuable information. For example, in the linear form of the price estimate formula, the coefficients on the exogenous variables may also be of interest. In this regard, a positive coefficient indicates that the price of the asset and the subject exogenous variables tend to grow together, perhaps as complements or through simultaneous market expansion efforts. Alternatively, a negative coefficient may indicate that the subject exogenous variable and the asset act as substitutes in the market place, perhaps participating competitively.

It is noted that the extent to which each such coefficient, standing alone, provides meaningful information typically will depend upon the extent to which the corresponding exogenous variable is correlated with one or more of the other exogenous variables that have been used. One way to address this correlation is to attempt to only use exogenous variables that largely are independent of each other (which may, for example, be accomplished by grouping together related exogenous variables to form composite exogenous variables such that the resulting composite exogenous variables are largely independent of each other). Another approach is to "pre-whiten" related exogenous variables with respect to each other, such as described below in connection with the "3-term regression model".

In the linear form of the price estimate formula, as noted in the '025 application, each coefficient typically will correspond to the sensitivity ($\beta$ or beta) of the subject asset to the exogenous variable, then and the elasticity ($\eta$ or eta) can be calculated from $\beta$ as follows:

$$\eta = \beta * (S/P) \quad \text{(Eq. 15)}$$

where S is the value of the exogenous variable and P is the price of the asset. It is noted that any or all of S, P and $\beta$ may be instantaneous values or average values over a selected time period. Also, in the event of a logarithmic expression of the price estimate formula, each coefficient generally instead will correspond directly to $\eta$. Either or both of the $\beta$s and the $\eta$s may be of interest for the reasons set forth in the preceding paragraph.

Other related values may also be of interest for similar reasons. For example a modified $\eta$ (I$\eta$) that reflects the impact (I) of the variability of the corresponding exogenous variable, as well as the elasticity of the asset to the exogenous variable, may also be of interest. Preferably, I$\eta$ is defined as:

$$I\eta_z = \eta * 100 * Z * (\sigma_s/S) \quad \text{(Eq. 16)}$$

or as any function of the above equation, where Z is the standard normal deviate (i.e., tails in a Normal distribution Z$\sigma$ from mean, where Z=1 leaves about 33%, Z=2 about 5%, Z=3 about 1%), and $\sigma_s$ is the standard error of the exogenous variable over the selected period.

Additionally, a value that addresses announcement effects (A$\eta$) may be defined. In this regard, it is noted that in cases where the value of the exogenous variable is only made available at discrete points separated by relatively long time periods (e.g., two weeks between announcement dates) most of the volatility exposure of an asset to the exogenous variable is likely to occur within a relatively small window around each announcement date. Accordingly, each A$\eta$ preferably is a measure of asset volatility to the corresponding exogenous variable within such a relatively small window (e.g., one day). More preferably, A$\eta$ is defined as:

$$A\eta = I\eta * \sqrt{N/n} \quad \text{(Eq. 17)}$$

or as any function of the above equation, where N is the number of days between announcements and n is the number of days in the announcement window. As can be seen from Eq. 17, A$\eta$ preferably is calculated similarly to I$\eta$ but with the standard error of the exogenous variable scaled to reflect that all or most of the variability occurs within a small fraction of any given time period.

The foregoing techniques also can be applied to determine $\eta$s and/or $\beta$s for entire portfolios. In this regard, an estimation of the $\eta$ for a portfolio of assets ($\pi\eta$) can be given as follows:

$$\pi\eta = \sum_{i=1}^{n} \frac{w_i \beta_i}{P_i} * S \quad \text{(Eq. 18)}$$

where $w_i$ is the proportion of the portfolio's value that is accounted for by asset i, $\beta_i$ is the sensitivity of the asset i to the subject exogenous variable, $P_i$ is the price of the asset i, and S is the value of the exogenous variable. Once again, any or all of the quantities $w_i$, $\beta_i$, or $P_i$ and S may be instantaneous or average values.

Alternatively, a different expression for the estimation of $\pi\eta$ is given as follows:

$$\pi\eta = \left[\frac{\sum_{i=1}^{n} x_i \beta_i}{\sum_{i=1}^{n} x_i P_i}\right] * S \quad \text{(Eq. 19)}$$

where $x_i$ is the number of units (e.g., shares) of asset i, and $\beta_i$, $P_i$ and S are as defined above.

The above embodiments of the invention typically use a group of exogenous variables that include macroeconomic variables and/or variables related to prices of assets in the same industry or sector as the subject asset. In a slightly alternative embodiment of the invention, all of the macroeconomic variables are grouped together and used to generate a "macrovalue" price estimate formula, and then all of the variables related to prices of assets in the same industry or sector as the subject asset are grouped together to generate a "comparables" price estimate formula, as follows:

$$\text{Asset}=\alpha+\beta 1^* \text{macrovalue}+\beta 2^* \text{comparables}+e1 \quad \text{(Eq. 20)}$$

where e1 is the error term, taken to be the asset-specific component. The above equation is referred to herein as the "3-term regression model" and the following discussion refers to regression technique, although it should be understood that similar models may be generated using other techniques (e.g., neural network techniques or any of the other techniques discussed herein).

The standard error from Eq. 20 can be used to determine whether the price deviation from the value estimated for a given day is due to statistically significant asset-specific information being capitalized in the marketplace. As discussed above, different post-modeling observation periods and different model estimation periods can be used. In addition, any of the various similarity measures and/or comparison measures discussed above can be computed.

A slightly more complicated procedure will generate the same adjusted $R^2$ statistic and the same standard error but will generate different coefficients that will be more readily interpreted. Specifically, before estimating the price estimate formula, one component is "prewhitened" with respect to the other component. For example, the part of the comparables-based estimate which is related to the macroeconomy can be removed by performing the following auxiliary regression:

$$\text{comparables}=\alpha'+\beta^* \text{macrovalue}+U \quad \text{(Eq. 21)}$$

Then, the series U is that portion of the comparables estimate not attributable to macroeconomic effects. Consequently, when the combination value model is estimated using U instead of the comparables estimate, the following regression will result:

$$\text{Asset}=\alpha+\beta 1'^* \text{macrovalue}+\beta 2'^* U+e1$$

In this situation, $\alpha$ and e1 typically will all have the same values as before. However, $\beta 1'$ will be the unique contribution from the macroeconomy and $\beta 2'$ will be the unique contribution from the comparables estimate (e.g., from the industry comparable companies chosen as index companies).

An even more advanced approach would be to determine a formula for estimating the macroeconomy price estimate as a function of the comparables estimate (e.g., using regression or any of the similar techniques described herein), and then to determine a formula for estimating the comparables estimate as a function of the macroeconomy estimate (e.g., using any such technique). These results would be substituted into the prior regression (or other formula), such that the actual price would be estimated in terms of the following variables:

1. The macroeconomy price estimate independent of the comparables estimate
2. The macroeconomy price estimate related to the comparables estimate
3. The comparables price estimate independent of the macroeconomy price estimate
4. The comparables price estimate related to the macroeconomy price estimate
5. The asset-specific effect.

This can be expressed mathematically as follows:

Let:
P=Actual asset price
$\hat{P}$=macroeconomy price estimate
$\tilde{P}$=comparables price estimate Then,
$\hat{P}=f(\tilde{P})+e=$"macroeconomy price estimate related to comparables price estimate"+"macroeconomy price estimate independent of comparables price estimate"

And
$\tilde{P}=f(\hat{P})+u=$"comparables price estimate related to macroeconomy price estimate"+"comparables price estimate independent of macroeconomy price estimate"

Applying
$P=\alpha 0+\beta 1 \cdot e+\beta 2 \cdot f(\tilde{P})+\beta 3 \cdot u+\beta 4 \cdot f(\hat{P})+z$
OLS, The coefficients $\beta 1$, $\beta 2$, $\beta 3$ and $\beta 4$ translate directly into the relative impact of variables 1, 2, 3 and 4 above, and z is the asset-specific effect (variable 5 above). These $\beta i$ series can be plotted as time series for a given asset to show changes in the relative impact of the industry (or group or sector) versus impact of the macroeconomy.

In another embodiment of the invention, an exogenous variable is used that reflects the sum of the market capitalization for all assets in the selected sector (including the subject asset). In this embodiment, the computed sum variable relates to the overall size of the relevant market place. The coefficient on this exogenous variable could be interpreted as the extent to which overall industry growth benefits the subject asset. The coefficients on the other individual assets in the sector would then indicate the additional extent to which such other asset specially helped or hurt the subject asset.

The foregoing discussion generally assumes a single asset. However, when such asset-specific price information is derived as described above for an asset that is a share of a mutual fund, the resulting similarity and comparison measures will tend to indicate apparent changes in investment strategy and performance, rather than factors such as "momentum".

Finally, the above discussion generally considers a similarity measure that reflects asset-specific price information. However, it is noted that the present invention is not so limited, and instead applies to all of the similarity measures discussed above.

Also, while the term "price" is used above, the present invention is not limited only to estimating prices. Rather, the above discussion also can pertain to estimating returns for assets.

Reports and Screening.

The present invention also contemplates generation of various reports for use in forecasting asset price changes, such as any of the following reports.

A. Reports

1. Series Reports

A report preferably is produced for each of the economic series (i.e., exogenous variables) used in Eta analysis (currently 18 series). The report preferably includes: (1) a brief discussion of the series is provided, including source and dates of release, and links to other sites with more detailed discussion; (2) A graph of the recent values of the series over time (the length of time covered depends on announcement frequency); (3) a frequency distribution of percentage changes in the series; and (4) a frequency distribution of individual stocks' Eta ($\eta$) values, along with a list of stocks with the 20 highest $\eta$ values and those with the 20 lowest $\eta$ values.

2. Company Reports

A report preferably is produced for each of over 15,000 listed companies, over 10,000 mutual funds, and about 1,000 stock indexes. The report preferably includes: (1) a graph depicting recent price (and volume where appropriate) and the estimated price based on $\eta$ regressions; (2) a table presenting the three $\eta$ measures, their statistical significance, and the next announcement date for each series; (3) a graph of two price estimates curves for the asset, corresponding to two model estimation periods ending on different dates and the recent asset prices; and (4) a table showing the similarity and comparison measures discussed above, with graphic representations.

3. Industry Reports

Industry reports preferably would include: (1) the market capitalization for various 2-digit SIC sectors as a percent of the total market; and (2) in each sector, the proportions of market capitalization represented by the 4-digit SIC industries in that sector, and the major traded firms in each industry. Such a report may be useful for matching firms to their industries and sectors and for determining their relative market capitalizations.

B. Asset Screening

The present invention also allows the user to screen assets based on Eta, estimated asset prices and industry measures, as well as various financial variables (e.g. market capitalization, earnings, price-earnings ratio, dividend, and yield). More details regarding a technique for screening are given in the '025 application.

C. Portfolio Analysis

With respect to portfolio analysis, a user enters into a system according to the present invention: the ticker symbol and number of shares for each stock in a portfolio. In response, using the methods and techniques discussed above the system provides to the user portfolio Eta measures.

System Environment.

Figure 5:
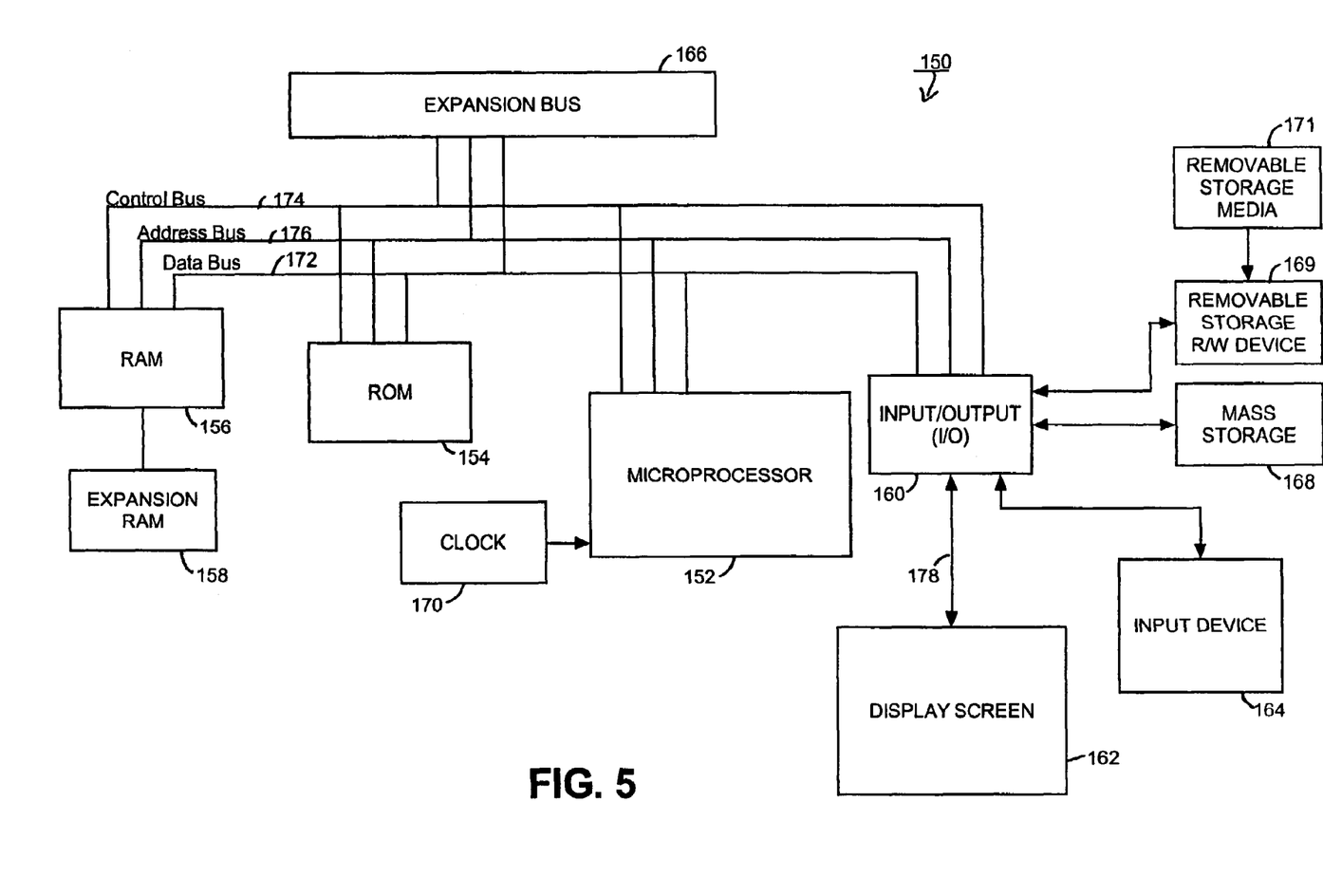
FIG. 5 is a block diagram of a general-purpose computer system, representing one suitable computer platform for implementing the methods of the present invention.

Generally, the methods described herein will be practiced with a general-purpose computer, either with a single processor or multiple processors. FIG. 5 is a block diagram of a general-purpose computer system, representing one of many suitable computer platforms for implementing the methods described above. FIG. 5 shows a general-purpose computer system 150 in accordance with the present invention. As shown in FIG. 5, computer system 150 includes a central processing unit (CPU) 152, read-only memory (ROM) 154, random access memory (RAM) 156, expansion RAM 158, input/output (I/O) circuitry 160, display assembly 162, input device 164, and expansion bus 166. Computer system 150 may also optionally include a mass storage unit 168 such as a disk drive unit or nonvolatile memory such as flash memory and a real-time clock 170.

CPU 152 is coupled to ROM 154 by a data bus 172, control bus 174, and address bus 176. ROM 154 contains the basic operating system for the computer system 150. CPU 152 is also connected to RAM 156 by busses 172, 174, and 176. Expansion RAM 158 is optionally coupled to RAM 156 for use by CPU 152. CPU 152 is also coupled to the I/O circuitry 160 by data bus 172, control bus 174, and address bus 176 to permit data transfers with peripheral devices.

I/O circuitry 160 typically includes a number of latches, registers and direct memory access (DMA) controllers. The purpose of I/O circuitry 160 is to provide an interface between CPU 152 and such peripheral devices as display assembly 162, input device 164, and mass storage 168.

Display assembly 162 of computer system 150 is an output device coupled to I/O circuitry 160 by a data bus 178. Display assembly 162 receives data from I/O circuitry 160 via bus 178 and displays that data on a suitable screen.

The screen for display assembly 162 can be a device that uses a cathode-ray tube (CRT), liquid crystal display (LCD), or the like, of the types commercially available from a variety of manufacturers. Input device 164 can be a keyboard, a mouse, a stylus working in cooperation with a position-sensing display, or the like. The aforementioned input devices are available from a variety of vendors and are well known in the art.

Some type of mass storage 168 is generally considered desirable. However, mass storage 168 can be eliminated by providing a sufficient amount of RAM 156 and expansion RAM 158 to store user application programs and data. In that case, RAMs 156 and 158 optionally can be provided with a backup battery to prevent loss of data even when computer system 150 is turned off. However, it is generally desirable to have some type of long term mass storage 168 such as a commercially available hard disk drive, nonvolatile memory such as flash memory, battery-backed RAM, PC data cards, or the like.

A removable storage read/write device 169 may be coupled to I/O circuitry 160 to read from and to write to a removable storage medium 171. Removable storage medium 171 may represent, for example, a magnetic disk, a magnetic tape, an opto-magnetic disk, an optical disk, or the like. Instructions for implementing the inventive method may be provided, in one embodiment, to a network via such a removable storage media, although such similarity measure may in fact be based upon observations made over an extended post-modeling observation.

In operation, information is input into the computer system 150 by typing on a keyboard, manipulating a mouse or trackball, or "writing" on a tablet or on position-sensing screen of display assembly 162. CPU 152 then processes the data under control of an operating system and an application program, such as a program to perform the steps of the inventive method described above, stored in ROM 154 and/or RAM 156. It is noted that such process steps may initially be stored in mass storage 168, downloaded into RAM 156 and then executed out of RAM 156. CPU 152 then typically produces data which are output to the display assembly 162 to produce appropriate images on its screen.

Expansion bus 166 is coupled to data bus 172, control bus 174, and address bus 176. Expansion bus 166 provides extra ports to couple devices such as network interface circuits, modems, display switches, microphones, speakers, etc. to CPU 152. Network communication is accomplished through the network interface circuit and an appropriate network.

Suitable computers for use in implementing the present invention may be obtained from various vendors. Various computers, however, may be used depending upon the size and complexity of the tasks. Suitable computers include mainframe computers, multiprocessor computers, workstations or personal computers. In addition, although a general-purpose computer system has been described above, a special-purpose computer may also be used.

It should be understood that the present invention also relates to machine readable media on which are stored program instructions for performing the methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

CONCLUSION

Many of the steps described above are similar to those described in the '025 application. In such cases, it is intended that all of the discussions and teachings of the '025 application are to be read in connection with the above discussion in describing the options and the considerations for performing the various steps of the above-described techniques.

In addition, although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood those skilled in the art.

What is claimed is:

1. A method for forecasting the direction in which the price of an asset will move, said method comprising:
   (a) identifying a group of exogenous variables that are likely to influence observed prices of an asset;
   (b) utilizing a computer to execute computer-executable process steps that include steps to:
      (i) process historical data for values of said exogenous variables and historical data for the observed prices of the asset over a time period to obtain a formula for calculating price estimates for the asset as a function of the exogenous variables;
      (ii) calculate the formula using an input set of observed values for the exogenous variables at given point in time, so as to obtain a price estimate for the asset at said given point in time; and
      (iii) determine a similarity measure by comparing the price estimate for the asset at the given point in time to the observed price for the asset at the given point in time; and
   (c) forecasting a direction in which the observed price of the asset will move based on the similarity measure.

2. A method according to claim 1, wherein the asset is a stock issued by a company doing business in a particular industry, and wherein a substantial number of the exogenous variables reflect prices of stocks issued by other companies that are also doing business in said particular industry.

3. A method according to claim 1, wherein said exogenous variables include macroeconomic variables.

4. A method according to claim 1, wherein at least some of said exogenous variables are identified in step (a) by performing stepwise regression over a number of potential exogenous variables and selecting the potential exogenous variables that provide a best fit.

5. A method according to claim 1, wherein at least some of said exogenous variables are identified in step (a) by modeling over a number of potential exogenous variables and selecting a set of the potential exogenous variables that tend to maximize predictive power of said modeling.

6. A method according to claim 1, wherein at least some of said exogenous variables are identified in step (a) by performing a statistical clustering technique.

7. A method according to claim 1, wherein said given point in time is after said time period.

8. A method according to claim 7, wherein said given point in time is approximately 30 days after said time period ends.

9. A method according to claim 1, wherein the time period is determined using a stepwise approach.

10. A method according to claim 1, wherein the asset comprises a share of stock issued by a corporation, and wherein the time period is determined based on changes affecting the corporation.

11. A method according to claim 7, wherein a duration of the time period is selected so as to maximize a predictive power of the formula over the time period.

12. A method according to claim 1, wherein said processing in step (i) comprises performing a statistical regression technique.

13. A method according to claim 1, wherein said processing in step (i) comprises performing a neural network technique.

14. A method according to claim 1, wherein step (iii) comprises a step of:
   (iii-1) determining a difference between the price estimate for the asset at the given point in time and the observed price for the asset at the given point in time.

15. A method according to claim 14, wherein step (iii) further comprises a step of:
   (iii-2) calculating a ratio of the difference determined in step (iii-1) to the price estimate for the asset at said given point in time.

16. A method according to claim 1, wherein step (iii) comprises determining a ratio of the price estimate for the asset at the given point in time to the observed price for the asset at the given point in time.

17. A method according to claim 1, wherein the computer-executable process steps further include a step to:
- (iv) determine a measure of accuracy variability, over the time period, of the price estimates for the asset calculated using the formula.

18. A method according to claim 17, wherein the computer-executable process steps further include a step to:
- (v) determine a measure of a statistical significance of the similarity measure by comparing the similarity measure to said measure of accuracy variability.

19. A method according to claim 18, wherein step (v) comprises calculating a ratio of the similarity measure to said measure of accuracy variability.

20. A method according to claim 17, wherein said measure of accuracy variability comprises a standard error of the formula, the standard error of the formula being a square root of an estimate of a variance of errors of the formula.

21. A method according to claim 1, wherein step (i) comprises steps to:
- (i-1) obtain a first formula for calculating price estimates for the asset as a function of macroeconomic variables;
- (i-2) obtain a second formula for calculating price estimates for the asset as a function of prices of other assets that are related to the asset; and
- (i-3) combine estimates from said first formula and said second formula to obtain said formula.

22. A method according to claim 21, further comprising a step of using price estimates from the first formula to remove macroeconomic effects from price estimates calculated using the second formula.

23. A method according to claim 1, wherein the computer-executable process steps further include a step to:
- (iv) repeat steps (ii) and (iii) for plural points in time after the time period ends in order to obtain plural similarity measures, and
- wherein the forecasting of step (c) is based on said plural similarity measures.

24. A method according to claim 23, wherein the computer-executable process steps further include a step to:
- (v) calculate a central tendency of the plural similarity measures, and
- wherein the forecasting of step (c) is based on said central tendency.

25. A method according to claim 23, wherein the computer-executable process steps further include a step to:
- (v) calculate a weighted average of the plural similarity measures, and
- wherein the forecasting of step (c) is based on said weighted average.

26. A method according to claim 1, further wherein the computer-executable process steps further include a step to:
- (iv) repeat steps (i)-(iii) using different time periods, and
- wherein the forecasting in step (c) is based on the similarity measures determined by using said different time periods.

27. A method according to claim 26, wherein said different time periods have approximately a same duration.

28. A method according to claim 27, wherein said different time periods include a time period ending approximately 30 days prior to said given point in time and a time period ending approximately 90 days prior to said given point in time.

29. A method according to claim 26, wherein the computer-executable process steps further include a step to:
- (v) calculating a ratio of the similarity measure determined by using one of the time periods to the similarity measure determined by using an other of the time periods.

30. A method according to claim 1, wherein said exogenous variables include prices of other assets that are similar to the asset.

31. A method according to claim 1, wherein step (c) is performed by evaluating the similarity measure as a measurement of changes due to factors that are not accounted for by the exogenous variables.

32. An apparatus for forecasting the direction in which the price of an asset will move, said apparatus comprising:
- (a) means for identifying a group of exogenous variables that are likely to influence observed prices of an asset;
- (b) means for processing historical data for values of said exogenous variables and historical data for the observed prices of the asset over a time period to obtain a formula for calculating price estimates for the asset as a function of the exogenous variables;
- (c) means for calculating the formula using an input set of observed values for the exogenous variables at given point in time, so as to obtain a price estimate for the asset at said given point in time;
- (d) means for determining a similarity measure by comparing the price estimate for the asset at the given point in time to the observed price for the asset at the given point in time; and
- (e) means for forecasting a direction in which the observed price of the asset will move based on the similarity measure.

33. An apparatus according to claim 32, wherein said means (c) evaluates the similarity measure as a measurement of changes due to factors that are not accounted for by the exogenous variables.

34. A computer-readable medium storing computer-executable process steps for forecasting the direction in which the price of an asset will move, said process steps comprising steps to:
- (a) identify a group of exogenous variables that are likely to influence observed prices of an asset;
- (b) process historical data for values of said exogenous variables and historical data for the observed prices of the asset over a time period to obtain a formula for calculating price estimates for the asset as a function of the exogenous variables;
- (c) calculate the formula using an input set of observed values for the exogenous variables at given point in time, so as to obtain a price estimate for the asset at said given point in time;
- (d) determine a similarity measure by comparing the price estimate for the asset at the given point in time to the observed price for the asset at the given point in time; and
- (e) forecast a direction in which the observed price of the asset will move based on the similarity measure.

35. A computer-readable medium according to claim 34, wherein step (c) is performed by evaluating the similarity measure as a measurement of changes due to factors that are not accounted for by the exogenous variables.

* * * * *